Sept. 28, 1937.　　　L. ORTHNER ET AL　　　2,094,408
PROCESS OF PREPARING CHLORINATED RUBBERS
Filed April 7, 1933
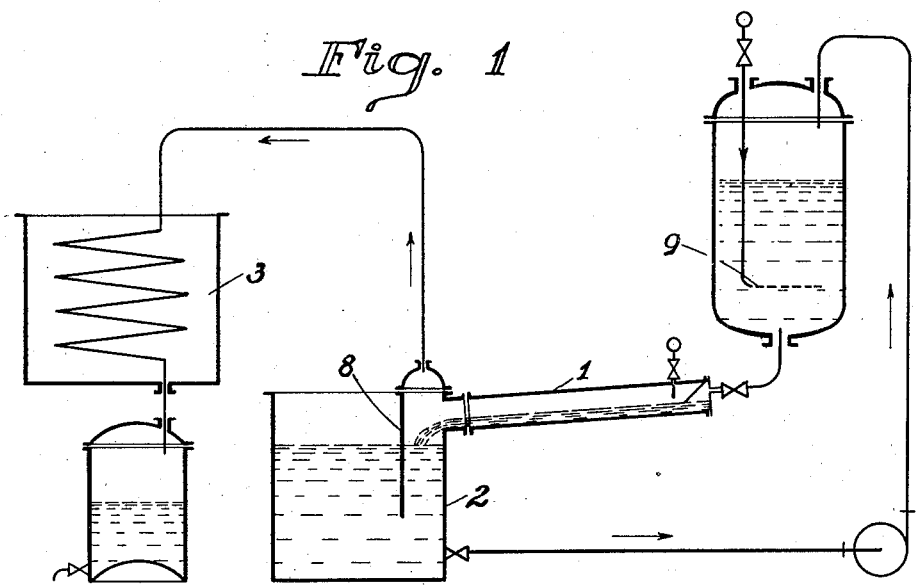
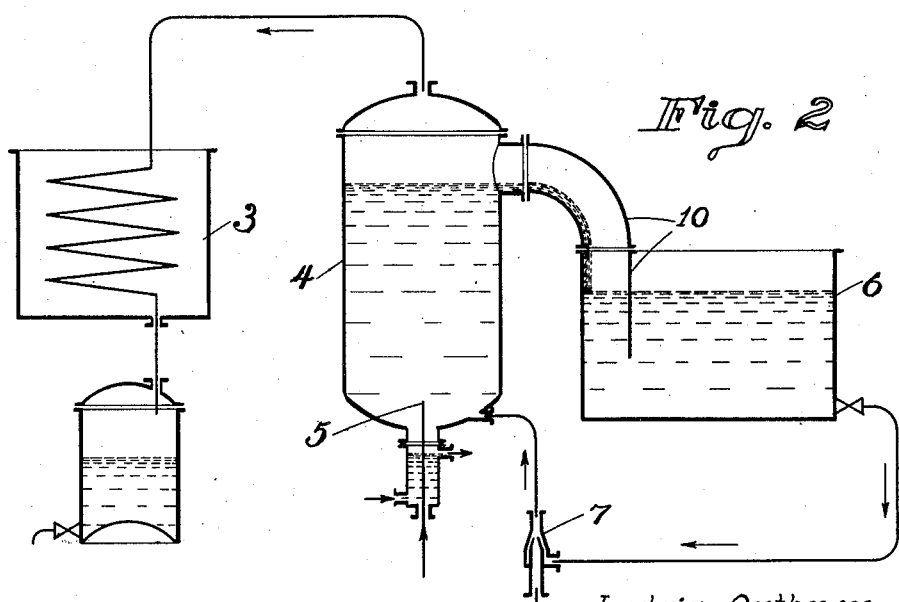
Ludwig Orthner,
Otto Böhme,
Georg Meyer,
Wilhelm Becker,
INVENTORS,
By Potter, Pierce & Scheffler,
THEIR ATTORNEYS.

Patented Sept. 28, 1937

2,094,408

UNITED STATES PATENT OFFICE 2,094,408

PROCESS OF PREPARING CHLORINATED RUBBERS

Ludwig Orthner and Otto Böhme, Leverkusen-I. G. Werk, and Georg Meyer and Wilhelm Becker, Cologne-Mulheim, Germany, assignors to I. G. Farbenindustrie Aktiengesellschaft, Frankfort-on-the-Main, Germany Application April 7, 1933, Serial No. 665,046 In Germany April 15, 1932

11 Claims. (Cl. 260—1)

The present invention relates to a process of preparing chlorinated rubbers and to new chlorinated rubbers obtainable by said process.

It is the object of the present invention to provide a process according to which chlorinated rubbers are obtained on a technical scale in a particular smooth and convenient manner.

It is a further object of the invention to provide a process according to which chlorinated rubbers are obtained which are substantially more stable than the chlorinated rubbers hitherto known.

It is known to chlorinate rubber while in solution in a suitable organic solvent, advantageously one which is not substantially attacked by chlorine under the conditions of working.

Furthermore, it is known that the isolation of the chlorinated rubbers thus obtained encounters difficulties, since the chlorinated rubbers when precipitated generally tend to agglutination so that it is difficult to obtain them in a form suitable for sale and for their use for technical purposes.

In accordance with the present invention chlorinated rubbers can be isolated from their solutions in organic solvents on a technical scale and in a very convenient manner and without the disadvantages above mentioned, by contacting the solutions of chlorinated rubbers with an aqueous precipitating bath which is heated to a temperature sufficient to distill off the solvent for the chlorinated rubber. This process may be carried out in various manners. For example, a solution of a chlorinated rubber may be caused to run or to drop into hot water, the temperature of which is sufficiently high to cause evaporation of the solvent for the chlorinated rubber.

According to a preferred embodiment of the invention the precipitation of the chlorinated rubber as described above is performed under conditions at which the precipitate is removed from the place of its precipitation (precipitation zone) as quickly as possible. This may be accomplished, for example, by causing a whirling movement of the precipitating bath or by causing the solution of the chlorinated rubber to enter the reaction vessel from below, whereby the precipitated rubber instantaneously wanders from the precipitating zone to the surface of the precipitating vessel.

Furthermore, the solution of the chlorinated rubber may be caused to enter the precipitating bath below its surface while intensely stirring. In this case it will be of advantage to add some chlorinated rubber to the precipitating bath before the precipitating process, which addition influences the form of the precipitating chlorinated rubber.

In all cases it will be of advantage to provide means to recover the organic solvents distilling off during the precipitating process.

These processes, in which the chlorinated rubbers are isolated by being quickly removed from the precipitating zone, may be easily developed to continuously working processes. For example, the solution of the chlorinated rubber may be caused to flow or drop into flowing hot water, the removal of the chlorinated rubber from the precipitating zone being performed by the flow of the water. Figure I of the accompanying drawing shows how the invention may be carried out according to this process. The solution of the chlorinated rubber is poured, dropped or sprayed into hot water flowing in the pipe (1), the water being continuously pumped through the apparatus. The precipitating chlorinated rubber flows with the water to the syphon (2) comprising vertical pipe wall (8). When the syphon (2) is filled with chlorinated rubber, the latter is removed from the apparatus by any desired mechanical means, if desired, by continuously working methods. The solvent evaporating during the process is recovered in the cooling device (3) and may be used in a further chlorinating process. The heating of the water may be performed directly by an open flame or by blowing in a current of steam as shown at (9) or by other means. The temperature of the water for yielding good results is dependent on the solvent contained in the chlorinated rubber solution. The higher the boiling point of the latter or of the system water-solvent, the higher should be the temperature of the water. Generally, temperatures surmounting for about 5–15° C. the boiling point of the respective solvent or the boiling point of the respective system water-solvent will yield good results. When working with the application of reduced pressure, substantially lower temperatures are obviously operable, and it may be mentioned that the use of reduced pressure is often of advantage in all the processes herein described.

Figure II shows another apparatus for continuously isolating chlorinated rubber from its solutions. The solutions from which the chlorinated rubber is to be precipitated is sprayed by a nozzle (5) into a closed vessel (4) containing the precipitating bath. The chlorinated rubber wanders to the surface of the precipitating bath as soon as it has separated and flows, through pipe (10), over into the vessel (6) together with some precipitating fluid. From the vessel (6) the chlorinated rubber may be removed mechanically by any desired means. The precipitating fluid entering vessel (6) together with the chlorinated rubber may be brought back into the vessel (5) by a pump or steam injector (7). The solvent evaporating from the chlorinated rubber solution may be condensed in a suitable cooler (3) and used for a further chlorinating process of rubber.

It is to be stated that the methods and apparatus above described may be varied within the widest limits without departing from our invention. Likewise, the form in which the precipitated rubber is obtained can be altered in any desired manner, for example, by changing the surface of the precipitating bath.

Such a finely divided and quickly drying chlorinated rubber may be obtained, for example, by adding wetting or emulsifying agents to the precipitating bath. Emulsion of the chlorinated rubber solution with water before its precipitation is, in some cases, of advantage.

According to a further feature of our invention the isolating processes above described may be combined with a stabilizing process. Under the term "stabilizing process" we understand quite generally the treatment of chlorinated rubber solutions with either alkali metal hydroxides at any desired temperature, or with alkaline reacting substances which are weaker than alkali metal hydroxides at elevated temperature (say from about 40–45° C. up to the boiling point of the chlorinated rubber solution or even higher). It is to be pointed out that these stabilizing processes are in no way equivalent to the known addition of certain basic reacting substances to chlorinated rubber or rubber solutions at normal temperatures. These latter methods only bring about a neutralization of free hydrochloric acid, whereas the specific use of alkali metal hydroxides, or of other alkaline reacting agents at elevated temperature effects an an alteration of the molecule of the chlorinated rubber itself with the result that substantially more stable chlorinated rubbers are obtained.

The methods according to which stabilization and isolation of the chlorinated rubbers may be performed are as follows:—

To a chlorinated rubber solution an alkali metal hydroxide or another alkaline reacting substance is added and the chlorinated rubber is stabilized as disclosed above. The solution may then be worked up to stable chlorinated rubber by bringing the same, if desired after filtration, into contact with hot water which is hot enough to cause evaporation of the solvent, according to any desired method as outlined above. On the other hand, the stabilizing agent may be brought into the precipitating bath, which latter also in this case is heated to a temperature high enough to cause evaporation of the solvent contained in the chlorinated rubber solutions, after which the solution of the chlorinated rubber is added to the precipitating bath in any desired manner to bring about precipitation and, simultaneously, stabilization of the chlorinated rubber. Obviously, the more specific methods above described are also operable in this case.

According to a further feature of the invention the solution of the chlorinated rubber is emulsified with water and an alkaline reacting substance before being precipitated according to one of the methods above mentioned. If alkali metal hydroxides are applied as the stabilizing agents, heating of the emulsion is not necessary, whereas in case weaker alkaline reacting agents are applied, heating of the emulsion before being precipitated is of advantage in order to obtain the best results. This method of stabilizing yields generally chlorinated rubbers which are not substantially discolored and the particles of which are very even in the degree of stabilization.

According to another feature of the invention solutions of chlorinated rubber containing an alkaline reacting agent may be subjected to steam distillation, whereby stabilization and precipitation of the chlorinated rubber occur simultaneously.

As alkaline reacting agents we prefer alkali metal hydroxides or alkaline reacting salts, such as alkali metal or ammonium carbonates, -bicarbonates, -acetates, furthermore, earthalkali metal oxides or hydroxides, earthalkali metal carbonates etc.

The following examples illustrate the invention, without, however, restricting it thereto:—

*Example 1*

700 kgs. of a 15% by volume solution of chlorinated rubber in carbon tetrachloride are introduced into 800 kgs. of water of 80° C. below the surface. The process is carried out in a closed stirring apparatus and the mixture of carbon tetrachloride+water distilling off is condensed in a suitable cooler. The chlorinated rubber obtained is soluble with a clear light yellow coloration in aromatic hydrocarbons. In many cases the form of the precipitating chlorinated rubber is favorably influenced by previously adding some solid chlorinated rubber to the precipitating bath.

*Example 2*

A solution (18,8% by volume) of a chlorination product of rubber in carbon tetrachloride, being carefully freed from superfluous chlorine and superfluous hydrochloric acid, is precipitated at a temperature of the precipitating bath of 90–92° C. in the apparatus as shown in drawing I. The solvent regained amounts to about 95%.

*Example 3*

A chlorinated rubber solution as described in Example 2 is precipitated in the same apparatus. To the precipitating bath 0,05% of the sodium salt of di-isobutyl-naphthalene sulfonic acid is added. The chlorinated rubber thus obtained is more finely divided than that obtained according to Example 2.

*Example 4*

The same chlorinated rubber solution as described in Example 1 is emulsified with ¼ volume of water with the aid of some Marseille soap while stirring. The emulsion obtained is introduced into water of 90–93° C. in the apparatus as shown in drawing II.

*Example 5*

A 10% solution of chlorinated rubber in benzene is sprayed by means of a spraying nozzle into flowing water of 90–95°. The chlorinated rubber obtained is of a finely dispersed form.

*Example 6*

32,3 kgs. of a 11,6% by volume solution of a chlorination product of rubber in carbon tetrachloride, being freed to a far reaching extent from superfluous hydrogen chloride, is heated in a stirring apparatus to the boiling point of the carbon tetrachloride. Thereupon a solution of 300 grams of technical, calcined soda in 5 litres of water is dropped in under continuous stirring in the course of half an hour. A rather liquid very stable emulsion is formed, which is heated while stirring for about 6–8 hours at a temperature of about 80–85° C. and worked up, for example, by spraying or dropping the emulsion into hot water.

The chlorinated rubber obtained is very stable and has hardly altered its other properties compared with the untreated product.

A similar result can be obtained by stabilizing the emulsion at a temperature of 65–75° C. for about 10–12 hours.

Example 7

21,8 kgs. of a technical chlorinated rubber solution (9,2% by volume) as described in Example 6 are heated to a temperature of 40–45° C. with 1,5 litres of a 3% caustic soda solution after the addition of 20 grams of the sodium salt of di-iso-butyl-naphthalene-sulfonic acid.

After stirring for 1½ hours at a temperature of 40 to 45° C., working up is performed as described in Example 6.

Example 8

32,3 kgs. of a technical chlorinated rubber solution in carbon tetrachloride (11,6% by volume) is heated in a stirring apparatus to the boiling point of the carbon tetrachloride. Thereupon a solution of 300 grams of tertiary sodium phosphate ($Na_3PO_4 + 10H_2O$) in 5 litres of water is introduced, while stirring, in the course of an hour, whereafter the emulsion is heated to a temperature of 80–85° C. for 2 hours under stirring.

Example 9

2 litres of a 18,8% by volume solution of a chlorination product of rubber are emulsified with a solution of 30 grams of calcined soda in ½ litre of water, while stirring and heating. The stabilized emulsion is then stirred for 6–8 hours at a temperature of 80° C. and precipitated in flowing water of 90–95° C. The precipitate is washed neutral with water and dried at a temperature of 60° C. The chlorinated rubber thus isolated is stable to a far reaching extent.

Example 10

100 kgs. of a 10% solution of chlorinated rubber in carbon tetrachloride are introduced below the surface of 120 kgs. of water of 80° C. while intensely stirring. Before the precipitating process 1,2 kgs. of sodium carbonate and 15 kgs. of solid chlorinated rubber are added to the water. A finely dispersed, stable chlorinated rubber is thus obtained.

Example 11

To 100 kgs. of a 10% solution of chlorinated rubber in tetrachloromethane 500 grams of an alkali metal carbonate or 900 grams of an alkali metal bicarbonate are added and the mixture is stirred at about 50–70° C. for about 5–10 hours. After cooling, the reaction mixture is introduced, if desired, after having been emulsified with water, below the surface of water of a temperature of about 80–85° C. while intensely stirring. This temperature is maintained, until the tetrachloromethane has escaped which will be the case within some hours. The precipitated chlorinated rubber is then sucked off, washed with water and dried.

We claim:—

1. The process which comprises gradually introducing a dilute solution of a chlorinated rubber into hot water the temperature of which is high enough to cause evaporation of the solvent, and quickly removing the precipitated disintegrated rubber from the precipitation zone.

2. The process which comprises gradually bringing a dilute solution of chlorinated rubber on the surface of flowing water the temperature of which is high enough to cause evaporation of the solvent, and quickly removing the precipitated disintegrated chlorinated rubber from the precipitation zone.

3. The process which comprises causing a dilute solution of a chlorinated rubber to enter a precipitation vessel below the surface of the hot water contained therein, the temperature of the water being high enough to cause evaporation of the solvent, and quickly removing the precipitated disintegrated rubber from the precipitation zone.

4. The process which comprises causing a dilute solution of a chlorinated rubber to enter from the bottom of a precipitation vessel containing hot water the temperature of which is high enough to cause evaporation of the solvent, and quickly removing the precipitated disintegrated chlorinated rubber from the precipitation zone.

5. The process which comprises stabilizing chlorinated rubber in a dilute solution with an alkaline reacting agent, gradually introducing the said dilute solution into hot water the temperature of which is high enough to cause evaporation of the solvent for the chlorinated rubber, and quickly removing the precipitated disintegrated chlorinated rubber from the precipitation zone.

6. The process which comprises stabilizing chlorinated rubber in a dilute solution with an alkaline reacting salt at a temperature of at least 40° C., gradually introducing the said dilute solution into hot water the temperature of which is high enough to cause evaporation of the solvent for the chlorinated rubber, and quickly removing the precipitated disintegrated chlorinated rubber from the precipitation zone.

7. The process which comprises gradually introducing a dilute solution of chlorinated rubber into hot water containing an alkaline reacting salt the temperature of the water being high enough to cause evaporation of the solvent, and quickly removing the precipitated disintegrated chlorinated rubber from the precipitation zone.

8. The process which comprises gradually introducing into hot water a dilute solution of chlorinated rubber containing an alkaline reacting salt the temperature of the hot water being at least 40° C., and quickly removing the precipitated disintegrated chlorinated rubber from the precipitation zone.

9. The process which comprises emulsifying a dilute solution containing chlorinated rubber with water and an alkaline reacting salt, gradually introducing the said dilute solution into hot water the temperature of which is high enough to cause evaporation of the solvent and quickly removing the precipitated disintegrated chlorinated rubber from the precipitation zone.

10. The process which comprises gradually introducing a dilute solution of a chlorinated rubber into hot water, the temperature of which is high enough to cause evaporation of the solvent under agitation sufficient to cause disintegration of the precipitated chlorinated rubber particles.

11. The process which comprises gradually introducing a dilute solution of chlorinated rubber into hot water containing an alkaline reacting salt, the temperature of the water being high enough to cause evaporation of the solvent, with agitation sufficient to cause disintegration of the precipitated chlorinated rubber particles.

LUDWIG ORTHNER.
OTTO BÖHME.
GEORG MEYER.
WILH. BECKER.